United States Patent

[11] 3,613,984

| [72] | Inventor | Walter J. Rozmus |
| --- | --- | --- |
| | | Hubbardsville, N.Y. |
| [21] | Appl. No. | 794,171 |
| [22] | Filed | Jan. 27, 1969 |
| [45] | Patented | Oct. 19, 1971 |
| [73] | Assignee | Kelsey-Hayes Company |

[54] ADJUSTABLE GATE FOR BUTT WELDING MACHINE
9 Claims, 8 Drawing Figs.

[52] U.S. Cl. ..................................... 228/3,
29/470.1, 228/44
[51] Int. Cl. ............................................ B23k 21/00,
B23p 3/02
[50] Field of Search ........................................ 228/3, 44;
29/470.1; 72/199; 10/27

[56] References Cited
UNITED STATES PATENTS
3,340,596  9/1967  Rozmus ....................... 228/3 X

| 3,093,018 | 6/1963 | Rozmus | 228/3 |
| 3,044,328 | 7/1962 | Zysk | 228/3 |
| 2,891,430 | 6/1959 | Johnson | 228/3 |

Primary Examiner—John F. Campbell
Assistant Examiner—R. J. Craig
Attorney—Harness, Dickey & Pierce ABSTRACT: A multiple upset pressure welding apparatus particularly adapted for cold welding wire ends together. The mechanism includes pairs of dies that are supported for relative movement toward and away from each other with the dies of the pairs also being relatively movable toward and away from each other. Gates or restraining devices are juxtaposed to each of the pairs of dies for permitting movement of the wires toward each other during the welding process and for precluding reverse movement of the wires when the pairs of dies are retracted. The restraining gates are adjustable so as to accommodate different size wires and to permit gripping of the wires adjacent the respective dies.

PATENTED OCT 19 1971
3,513,984
SHEET 1 OF 2
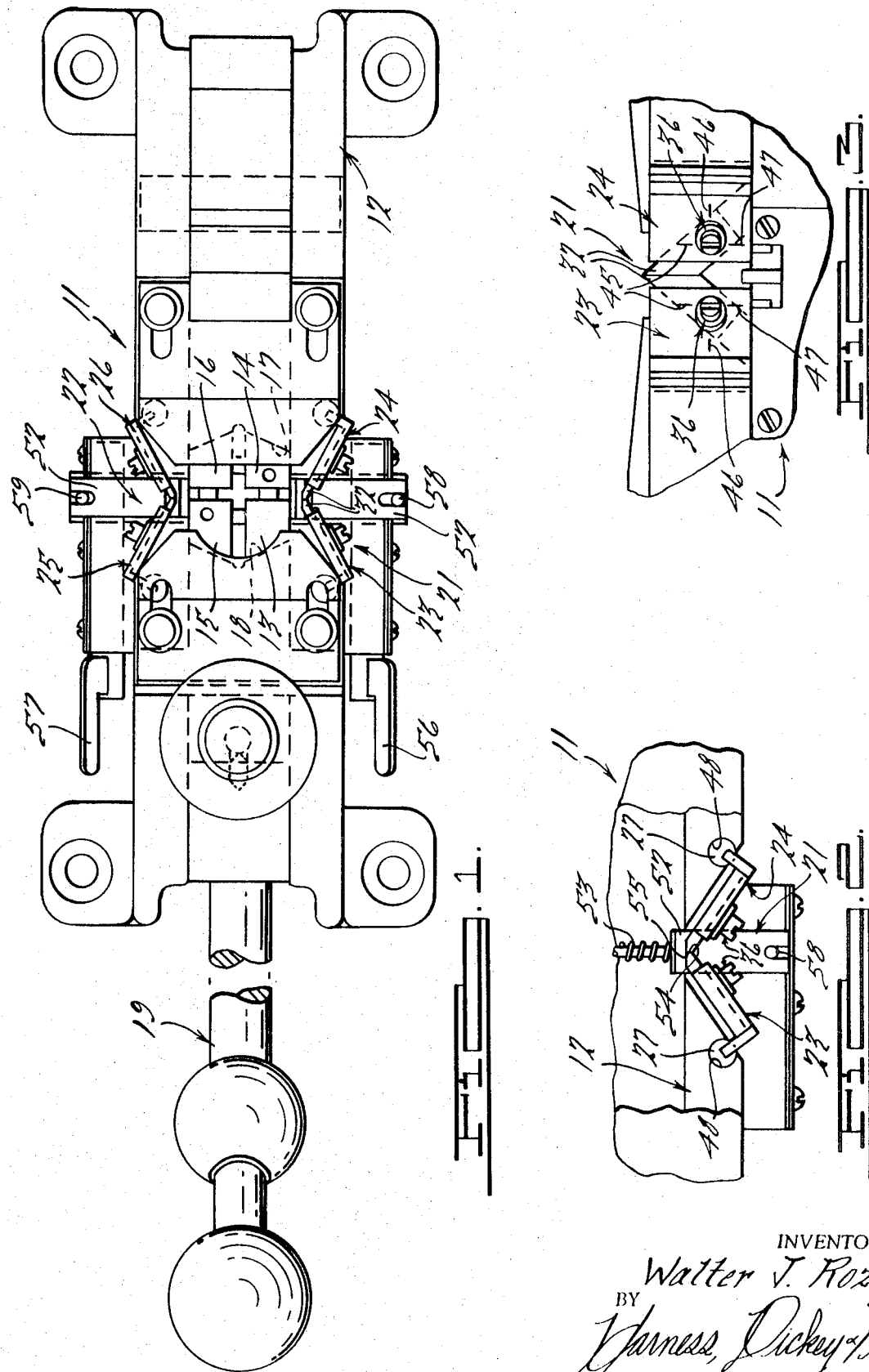
INVENTOR.
Walter J. Rozmus
BY
Harness, Dickey & Pierce
ATTORNEYS

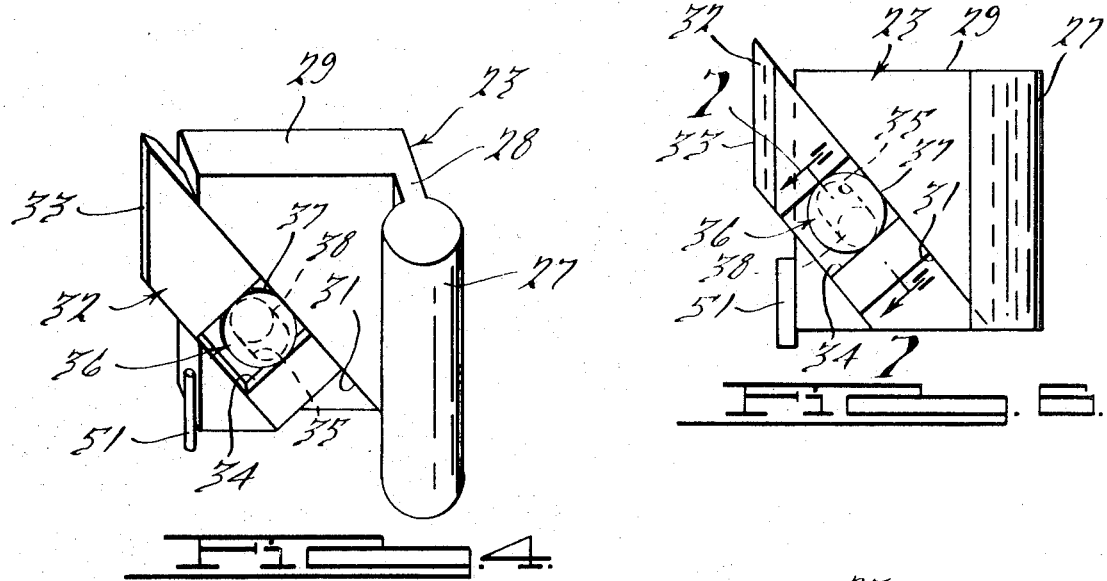
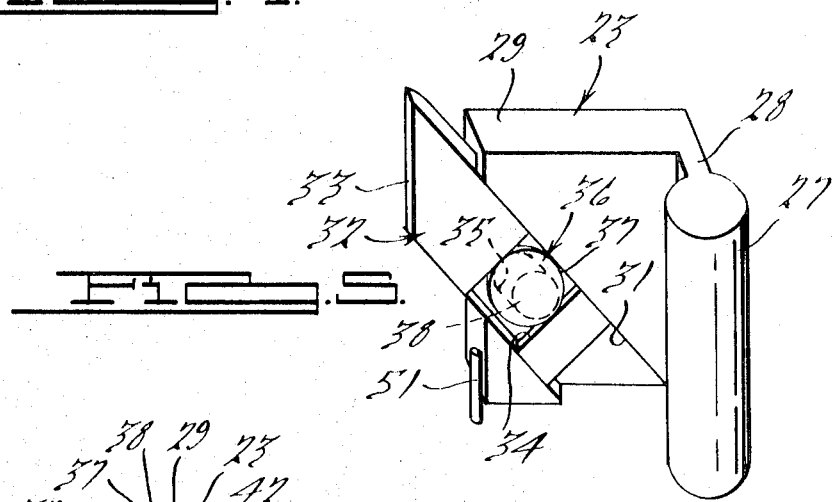
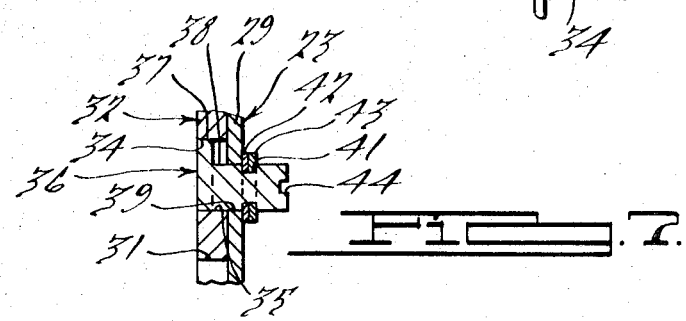
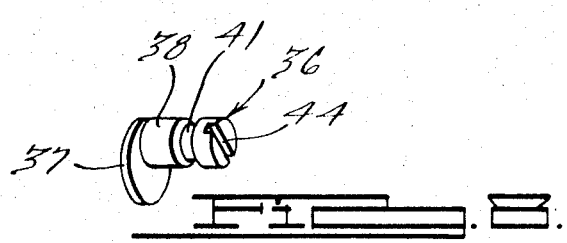

ADJUSTABLE GATE FOR BUTT WELDING MACHINE

BACKGROUND OF THE INVENTION

This invention relates to a wire working machine or the like and more particularly to an adjustable restraining means for holding a workpiece in such a machine.

Generally, this invention is adapted to be embodied in connection with a multiple upset pressure welding technique as disclosed in my U.S. Pat. No. 3,106,013, entitled "Method of Pressure Welding Metals," issued Oct. 8, 1963. Additionally, the apparatus disclosed herein is particularly adapted for use in an apparatus as shown in my U.S. Pat. No. 3,309,766, entitled "Cold Pressure Welding Apparatus and Method," issued Mar. 21, 1967. In connection with this welding technique, a first and second pair of dies are provided with the dies of the pairs being relatively movable toward and away from each other between a released position and a wire gripping position. The pairs of dies are also relatively movable toward and away from each other between a normal position and a welding position. As is noted in my aforenoted patents, the welding technique involves a repeated upsetting process wherein the dies undergo the aforenoted relative movement through several cycles. After the first upset has occurred, retraction of the dies will exert some tensile force on the wires that tends to separate the weld. A gripping or restraining mechanism is, therefore, normally provided to restrain the wires and preclude their being pulled apart. The restraining mechanism shown in my aforenoted U.S. Pat. No. 3,309,766 employs pairs of pivotally supported gates that permit the wire to be drawn inwardly as the dies close, but which coact to preclude any substantial reverse movement of the wires. This restraining mechanism has proven to be highly satisfactory but does have certain defects, particularly if the welding machine is adapted to handle wires of different diameters.

In order to assure maximum efficiency, the point of engagement between the gates and the wire ends should be disposed closely adjacent the retracted position of the adjacent pair of dies. This proximity precludes buckling of the wires when the dies are retracted. If the gates are designed to have such close proximity for a given size wire, the use of the machine to weld a larger diameter wire will cause interference between the gates and the dies. It has, therefore, been a common practice to substitute different sets of restraining gates when different size wires are welded with the machine. In addition to being time consuming, the small gates may be readily misplaced or the wrong sets may be installed in the machine.

It is, therefore, a principal object of this invention to provide an adjustable restraining means for a wire working machine.

It is another object of this invention to provide an adjustable restraining gate structure for a cold wire butt welding machine.

SUMMARY OF THE INVENTION

This invention is particularly adapted to be embodied in a wire working machine or the like of the type having first and second pairs of dies and means for supporting the dies of the pairs for relative movement toward and away from each other and for supporting the pairs of dies for relative movement toward and away from each other. Restraining means are provided, in accordance with the invention, for engaging a workpiece and holding the workpiece against any substantial movement as the pairs of dies move away from each other. This restraining means comprises at least a first member that is supported for pivotal movement about an axis spaced from at least one of the pairs of dies. The first member has an engaging portion spaced from the pivot axis and juxtaposed to the one pair of dies. This engaging portion is adapted to engage a workpiece for restraining the workpiece from movement in one direction as the pair of dies move away from each other. The first member is pivotal about the pivot axis for permitting movement of the workpiece in a direction opposite to the one direction as the pair of dies move toward each other. Means are provided for adjusting the distance between the pivot axis and the engaging portion for accommodating different size workpieces and for maintaining the engagement of the engaging portion with such workpieces in close proximity to the one pair of dies.

BRIEF DESCRIPTION OF THE DRAWINGS

FIG. 1 is a top plan view of a multiple upset pressure welding machine embodying this invention.

FIG. 2 is an enlarged view of the restraining gates associated with one pair of dies in the machine shown in FIG. 1 with portions of the machine removed.

FIG. 3 is a side elevational view of the gates shown in FIG. 1.

FIG. 4 is an enlarged perspective view of one of the restraining gates.

FIG. 5 is a view, in part similar to FIG. 4, showing the gate in another position.

FIG. 6 is a side elevational view of the gate shown in FIG. 4.

FIG. 7 is a cross-sectional view taken along the line 7—7 of FIG. 6.

FIG. 8 is a perspective view of the eccentric adjusting pin of the gate.

DETAILED DESCRIPTION OF THE PREFERRED EMBODIMENT

Referring first to FIG. 1, a cold wire butt welding machine embodying this invention is identified generally by the reference numeral 11. The machine 11 is particularly adapted to perform a multiple upset welding technique as disclosed in my aforenoted U.S. Pat. No. 3,106,013 and may be constructed in substantial accordance with my aforenoted U.S. Pat. No. 3,309,766. For this reason, the details of the construction of the complete machine will not be given and only that portion of the machine necessary to understand the invention of this application will be described in detail.

The machine 11 includes generally a frame assembly 12 in which a first pair of welding dies 13 and 14 and a second pair of welding dies 15 and 16 are supported. First and second V-blocks 17 and 18 coact with the dies 14, 16 and 13, 15, respectively.

One or the other or both of the V-blocks 17 and 18 may be actuated by means of an operating handle assembly 19 and interrelated actuating mechanism (not shown) for causing the V-blocks 17 and 18 to undergo relative movement toward and away from each other. As the V-blocks 17 and 18 move toward each other, the pairs of dies 13, 14 and 15, 16 will be moved relatively toward each other and the dies of the pairs will also be moved relatively toward each other. The movement of the dies 13, 14 and 15, 16 toward each other will cause these dies to move from a retracted position to a gripping position with the associated wire ends (not shown) wherein the wires are gripped in the respective grooves of the dies as disclosed in my aforenoted patents. The movement of the pairs of dies 13, 14 relatively toward the pair of dies 15, 16 will cause the wire ends to be brought into abutting relationship for upsetting as also disclosed in my aforenoted United States patents. Return movement of the handle assembly 19 causes relative retraction of the V-blocks 17, 18 and the springs (not shown) associated with the dies 13, 14, 15, 16 causes retraction of the dies to the position shown in FIG. 1.

When the dies 13, 14, 15, 16 are in their retracted, open positions, it is desirable to provide some means for holding the wire ends against movement. In addition, due to the use of the V-blocks 17, 18 the dies 13, 14 and 15, 1 retract away from each other at the same time as these pairs of dies open. Hence, they will exert a tensile force upon the upset wire unless the wire is held against return movement along with the dies 13, 14 and 15, 16. Restraining devices 21 and 22 are provided for coaction with the pairs of dies 13, 14 and 15, 16, respectively. These restraining devices will now be described in detail, particular reference being had additionally to the remaining figures.

The restraining device 21 is comprised of a pair of pivotally supported gates 23 and 24, and the restraining device 22 is comprised of a pair of pivotally supported restraining gates 25 and 26. The gates 23, 24 and 25, 26 are substantially the same in construction with the gate 23 being identical to the gate 26 and the gate 24 being identical to the gate 25. In addition, the gates 24 and 25 are symmetrically opposite to the gates 23 and 26. Thus, only the gate 23 will be described in detail. The gate 23 is comprised of a supporting portion 27 which also forms a pivot pin for pivotally supporting the gate 23 in a manner which will become more apparent as this description proceeds. An L-shaped arm comprised of a first leg 28 and a second leg 29 is integrally formed with the pivot pin mounting portion 27. The legs 28 and 29 extend at right angles to each other. The face of the leg 29 that is adapted to be positioned adjacent the die 13 is formed with a diagonally extending slot 31 in which a gripping member 32 is slidably supported. The gripping member 32 has a gripping edge 33 that is adapted to engage the wire, as will become more apparent as this description proceeds, and a transverse slot 34. At the base of the slot 34, the gripper 32 is formed with an elongated generally oval-shaped aperture 35.

An eccentric adjusting pin, indicated generally by the reference numeral 36, is provided for restraining the gripper 32 within the slot 31 of the gate 23 and for adjusting the distance between the engaging end 33 and the pivot axis defined by the portion 27. The eccentric pin 36 is formed with a first, enlarged cylindrical portion 37 that is received in the slot 34 in the outer face of the gripper 32 and which has a diameter substantially equal to the width of the slot 34. A second cylindrical portion 38 of the pin 36 extends through the elongated slot 35 of the gripper 32 and is journaled in a cylindrical bore 39 formed in the gate leg 29 at the base of its slot 31. Adjacent the outer face of the leg 29, the pin 36 is formed with a reduced portion 41 in which a spring washer 42 and snap ring 43 are received to hold the gripper member 32 relative to the leg 29 of the gate and to create sufficient frictional force to preclude against inadvertent rotation of the pin 36. The outer end of the pin 36 is formed with a slotted head 44 so as to permit insertion of a flat bladed tool such as a screwdriver whereby the pin 36 may be rotated. It will be noted that the cylindrical portion 37 has its axis disposed eccentrically to the axis of the portion 38. Rotation of the pin 36 will, therefore, cam the gripper 32 from a fully shortened position (FIG. 4) to a fully extended position (FIG. 5). This rotation adjusts the distance between the gripping edge 33 and the pivot axis defined by the pin portion 27. If desired, the rear face of the leg 29 may be provided with indicia 45, 46 and 47 that coact with the slotted portion 44 of the pin 36 to indicate three positions of adjustment.

Referring now primarily to FIGS. 1 through 3, the mounting portions 27 of each of the gates 23, 24, 25 and 26 is mounted in respective complementary cylindrical bore 48 formed in the machine base 12. Each of the gates 23, 24, 25 and 26 has a depending pin 51 affixed to the outer portion of its leg 29 (FIGS. 4 through 6). The pins 51 of the gates 23 and 24 are received in a groove (not shown) formed in a biasing member 52 that is slidably supported by the machine 11 and which is engaged by a spring 53 to urge the gates 23 and 24 in a clockwise and counterclockwise direction, respectively. If no wire is in place, beveled rear surfaces 54 and 55 of the gates 23 and 24 will engage each other so that the gripping edges 33 lie against each other. A similar structure is provided for the gates 25 and 26 and description of this structure will not be repeated. If it is desired to open the gates 23, 24 and 25, 26 so that wire ends can be inserted, handles 56 and 57 are rotated toward the frame 12. These handles operate upstanding pins 58 and 59 that are received in slots at the rear ends of the biasing members 52. The biasing members 52 will then be urged inwardly against the action of the springs 52 to open the gates 23, 24 and 25, 26.

When wires are properly loaded in the machine and the multiple upset welding technique employed in the manner previously described, the gates 23, 24 and 25, 26 will pivot against the action of the springs 53 to permit the ends of the wires to be drawn inwardly as the pairs of dies 13, 14 and 15, 16 move toward each other. When the dies retract, however, the pressure of the gates 23, 24 and 25, 26 upon the wires under the action of the springs 53 will preclude the wires from retracting.

As has been noted, it is important that the point of contact between the ends of the gates 23, 24 and 25, 26 and particularly the gripping edges be disposed as closely as possible to the adjacent dies 13, 14, 15 and 16. Some gap, however, must exist to permit the pivotal movement previously described. It should also be apparent that if the ends 33 were disposed at a fixed distance from the pivot axis defined by the gate portions 27, the insertion of a larger wire into the machine would cause the points 33 to move closer to the respective dies. Hence, if these points were disposed closely adjacent the dies and the larger wire inserted, interference would result. Thus, the adjustment provided for by the gates 23, 24, 25 and 26, which has been described, permits wires within a large range of diameters to be gripped each closely adjacent the respective die.

What is claimed is:

1. In a wire working machine or the like of a type having a first pair of dies, a second pair of dies and means for supporting the dies of said pairs for relative movement toward and away from each other and for supporting said pairs of dies for relative movement toward and away from each other, the improvement comprising restraining means for engaging a workpiece and holding the workpiece against any substantial movement as said pairs of dies move away from each other, said restraining means comprising at least a first member, means for supporting said first member for pivotal movement about an axis spaced from at least one of said pairs of dies, an engaging portion spaced from said pivot axis and juxtaposed to said one pair of dies, said engaging portion being adapted to engage a workpiece for restraining the workpiece from movement in one direction as said pairs of dies move away from each other, said first member being pivotal about said pivot axis for permitting movement of the workpiece in a direction opposite to the one direction as said pairs of dies move toward each other, and means for adjusting the distance between said pivot axis and said engaging portion for accommodating different size workpieces and for maintaining the engagement of said engaging portion with such workpieces in close proximity to said one pair of dies.

2. A wire working machine or the like as set forth in claim 1 wherein the first member defines a pivot pin portion and an outstanding arm portion, said pivot pin portion comprising the means for supporting the first member for pivotal movement, and further including a restraining member movably supported upon said arm and adjustable with respect thereto.

3. A wire working machine or the like as set forth in claim 1 wherein the means for adjusting the distance between the pivot axis and the engaging portion comprises an eccentric pin.

4. A wire working machine or the like as set forth in claim 1 wherein the first member defines a pivot pin portion and an outstanding arm portion, said pivot pin portion comprising the means for supporting the first member for pivotal movement, a restraining member slidably supported by said arm and having an end portion adapted to engage the workpiece for restraining the workpiece, an eccentric pin having a first cylindrical portion journaled in said restraining member and a second cylindrical portion journaled in said arm, said first cylindrical portion having its axis offset with respect to said second cylindrical portion for adjustment of the position of said engaging member with respect to the pivot axis defined by said pivot pin portion.

5. A wire working machine or the like as set forth in claim 1 further including a second restraining member as defined in claim 1, each of said restraining members being juxtaposed to a respective die of the one pair of dies.

6. A wire working machine or the like as set forth in claim 5 wherein each of the restraining members comprises a pivot pin portion and an outstanding arm portion, said pivot pin portion comprising the means for supporting the first member for pivotal movement, a restraining member slidably supported by said arm and having an end portion adapted to engage the workpiece for restraining the workpiece, an eccentric pin having a first cylindrical portion journaled in said restraining member and a second cylindrical portion journaled in said arm, said first cylindrical portion having its axis offset with respect to said second cylindrical portion for adjustment of the position of said engaging member with respect to the pivot axis defined by said pivot pin portion.

7. A wire working machine or the like comprising a first pair of dies, a second pair of dies, means for supporting the dies of said pairs of dies for relative movement toward and away from each other and for supporting said pairs of dies for relative movement toward and away from each other, restraining means for engaging a workpiece and holding the workpiece against any substantial movement as said pairs of dies move away from each other and for permitting the workpiece to move as said pairs of dies move toward each other, said restraining means having an engaging portion juxtaposed to said first pair of dies and adapted to engage the workpiece, and means for adjusting the position of said engaging portion relative to said first pair of dies for accommodating different size workpieces and for maintaining the engagement of said engaging portion with such workpieces in close proximity to said one pair of dies.

8. A wire working machine or the like as set forth in claim 7 wherein the restraining means is pivotally supported.

9. A wire working machine or the like as set forth in claim 8 wherein the means for adjusting the position of the engaging portion includes means for adjusting the distance between the pivot axis of the restraining means and its engaging portion.